United States Patent [19]

Cozens

[11] Patent Number: 5,163,826
[45] Date of Patent: Nov. 17, 1992

[54] CRESCENT GEAR PUMP WITH HYPO CYCLOIDAL AND EPI CYCLOIDAL TOOTH SHAPES

[76] Inventor: Eric E. Cozens, 205 Queen Mary Drive, Apt. 1508, Oakville, Ontario, Canada, L6K 3K8

[21] Appl. No.: 601,674

[22] Filed: Oct. 23, 1990

[51] Int. Cl.$^5$ .................. F16H 55/06; F04C 1/06
[52] U.S. Cl. .................. 418/170; 74/390; 74/462; 29/893; 418/150
[58] Field of Search .............. 418/150, 171, 170; 74/462, 390; 29/893

[56] References Cited

U.S. PATENT DOCUMENTS

| | | | |
|---|---|---|---|
| 1,516,591 | 11/1924 | Edwards | 418/171 |
| 2,960,884 | 11/1960 | Hill | 74/462 |
| 3,907,465 | 9/1975 | Dorff et al. | 418/171 |
| 3,907,470 | 9/1975 | Harle | 418/170 |
| 3,946,621 | 3/1976 | Rouverol | 74/462 |
| 3,982,445 | 9/1976 | Rouverol | 74/462 |
| 4,504,202 | 3/1985 | Saegusa | 418/171 |
| 4,518,332 | 5/1985 | Saegusa | 418/171 |
| 4,657,492 | 4/1987 | Saegusa | 418/171 |
| 4,922,781 | 5/1990 | Peiji | 74/462 |

Primary Examiner—Richard A. Bertsch
Assistant Examiner—David L. Cavanaugh

[57] ABSTRACT

A crescent pump gear including: a housing having a chamber communicating with an intake port and a discharge port; a shaft journaled for rotation within said chamber; an externally toothed inner gear mounted centrally on said shaft about a first axis; an internally toothed annular gear eccentrically mounted for rotational engagement with said inner gear about a second axis; a crescent contacting a portion of said inner gear has a dual cycloidal tooth profile generated about a first generating circle and said outer gear has a dual cycloidal tooth profile generated about a second generating circle.

33 Claims, 8 Drawing Sheets

CRESCENT GEAR PUMP WITH HYPO CYCLOIDAL AND EPI CYCLOIDAL TOOTH SHAPES

FIELD OF INVENTION

This invention relates to a crescent gear set having dual cycloidal tooth profiles; and in particular relates to a crescent pump gear having inner and outer gears with dual cycloidal tooth profiles.

BACKGROUND TO THE INVENTION

Crescent pump gear systems consists of an inner gear and an outer gear located at an offset. The gear set operates in a sealed housing with the inner gear driving the outer gear in mesh at the top dead band. The bottom dead band is sealed using a crescent shaped section of housing between the major diameter of the inner gear and the minor diameter of the outer gear.

Crescent pump gear systems are typically used in pumps with high pressure applications since the sealing capability of the gears against the crescent is enhanced due to the number of teeth on both the inner and outer gears that seal across the crescent of the pump at any particular point in time.

Conventional crescent pumps usually have heretofore utilized involute gear forms. However due to the mathematical generated of involute curves the gear teeth on a crescent system utilizing involute gear forms will be small and require a large offset in order to function properly. This greatly reduces the displacement of the pump for a given pump size.

In the construction of gear pumps having a high output, significant value is placed on utilizing fewer number of teeth since fewer number of teeth will result in low tooth mesh or engagement frequency and consequently a low frequency noise is observed during operation.

Furthermore a small number of teeth is further desirable since it will result in larger tooth gaps and hence bring about a larger discharge or delivery volume and therefore increase the pumping characteristics of a given pump.

Various tooth profiles have heretofore been proposed.

For example U.S. Pat. No. 1,516,591 teaches that the addendum sections of an inner gear are formed on epi cycloidal curves while the dedendum sections are formed on hypo cycloidal curves. However this patent teaches that the generation of the epi cycloidal and hypo cycloidal curves of the gear teeth are the same in diameter.

Moreover U.S. Pat. No. 3,907,470 illustrates that the outermost flanks of two adjacent teeth on an annual gear wheel are defined by a circular arc or an arc of a curve equidistant from a hypo cycloid.

Moreover U.S. Pat. No. 4,504,202 illustrates a centred outer rotor for a rotary pump utilizing the trocoidal curve and manufacturing method for the rotor, whereby the rotor is formed to make a combinational gap between an inner rotor and the outer rotor as small and constant as possible in order that both the inner and outer rotors are rotatable.

Another device is disclosed in U.S. Pat. No. 4,518,332 which teaches an oil pump using internal gearing wherein the different in the number of teeth between the internal and external gears is one and wherein the inner rotor is directly connected to the crank shaft of the internal combustion engine or to the transmission shaft.

Finally U.S. Pat. No. 4,657,492 teaches a rotor for a rotary pump.

These and other gear sets and rotary gear pumps present relatively complicated structures which have relative utility.

It is an object of this invention to provide an improved crescent gear set and in particular to provide an improved crescent gear pump displacing more oil from an equivalent size gear set.

It is an aspect of this invention to provide a crescent gear set comprising; externally rounded toothed annular gear journaled for rotation about a first axis; and externally toothed annular gear rotatably engageable within said externally toothed annular gear about a second axis; a crescent contacting a portion of said internally and externally annular gears; said externally toothed gear having dual cycloidal tooth profiles generating about a first generating circle and said internally toothed gear having dual cycloidal tooth profiles generated about a second generating circle.

It is a further aspect of this invention to provide a crescent pump gear including; a housing having a chamber communicating with an intake port and a discharge port; a shaft journaled for rotation within said chamber; and externally toothed inner gear mounted centrally on said shaft about a first axis; an internally toothed annular gear eccentrically mounted for rotational engagement within said inner gear about a second axis; a crescent contacting a portion of said inner and outer gears; said inner gear having dual cycloidal tooth profiles generated about a first generating circle, and said outer gear having dual cycloidal tooth profiles generated about a second generating circle.

It is a further aspect of this invention to provide; a method of producing tooth profiles of externally toothed inner gears eccentrically offset and engageable with internally toothed annular outer gears, said inner and outer gears contacting a crescent having an inner crescent radius and an outer crescent radius, said method including the steps of: generating the pitch circle of said outer gear; producing an epi cycloid of a first cycloid set by rolling said epi cycloid in a clockwise direction about the pitch circle of said outer gear starting at the vertical axis for a full 180° of roll; producing a hypo cycloid of a first cycloid set by rolling in a counterclockwise direction around the pitch circle of said outer gear starting at the vertical axis until the generated curve intersects at outer crescent radius; producing an epi cycloid of a second cycloid set by rolling in a counterclockwise direction about said pitch circle of said inner gear starting at an angle from the vertical axis equal to 360° divided by the number of teeth of said outer gear minus two times the angle resulting from the length of roll of said first epi cycloid roll for a complete 180°; producing a hypo cycloid of a second cycloid set by rolling in a clockwise direction about said pitch circle of said outer gear starting at an angle from the vertical axis equal to 360° divided by the number of teeth on said outer gear minus two times the angle resulting from the roll of said first epi cycloid roll until the generated curve intersects said outer crescent radius; connecting the resulting gear profiles with an arc slightly offset from said outer crescent radius in order to provide running clearance; copying the resulting gear form about the centre of said pitch circle of said outer gear at increments equal to 360° divided by the number of teeth of said outer gear; generating the pitch circle of said inner gear; producing an epi cycloid of a first cycloid set by rolling said epi cycloid in a clockwise direction about said pitch circle of said inner gear by starting at the vertical axis of said pitch circle of said inner gear until the generated curve intersects said inner crescent radius; producing a hypo cycloid of a first cycloid set by rolling in a counterclockwise direction about said pitch circle of said inner gear by starting at the vertical axis until the generated curve is slightly smaller in length than said hypo cycloid curve generated on said outer gear; producing an epi cycloid of a second cycloid set by rolling in a clockwise direction about said pitch circle of said inner gear starting at an angle from the vertical axis equal to 360° divided by the number of teeth on said inner gear minus two times the angle resulting from a full 180° theoretical roll of said first epi cycloid until the generated curve intersects at inner crescent radius; providing a hypo cycloid of a second cycloid set by rolling in a clockwise direction around the pitch circle of said inner gear starting at an angle from the vertical axis equal to 360° divided by the number of teeth on the inner gear minus two times the angle resulting from the full 180° theoretical roll of said first epi cycloid until the generated curve is slightly smaller in length than the hypo cycloid curve generated on the outer gear and is equal in length to the hypo cycloid curve generated by said first cycloid set; connecting the resulting gear profiles with an arc offset slightly from the connecting arc on the outer gear set to provide a running clearance; copying the resulting gear form about the centre of said pitch circle of said inner gear at increments equal to 360° divided by the number of teeth of said inner gear; connecting the gaps left between said epi cycloids with an arc slightly smaller than the inner crescent arc in order to provide running clearance.

DESCRIPTION OF DRAWINGS

These and other objects and features of the invention shall now be described in relation to the following drawings.

DESCRIPTION OF THE INVENTION

Like parts have been given like numbers throughout the figures.

Figure 1:
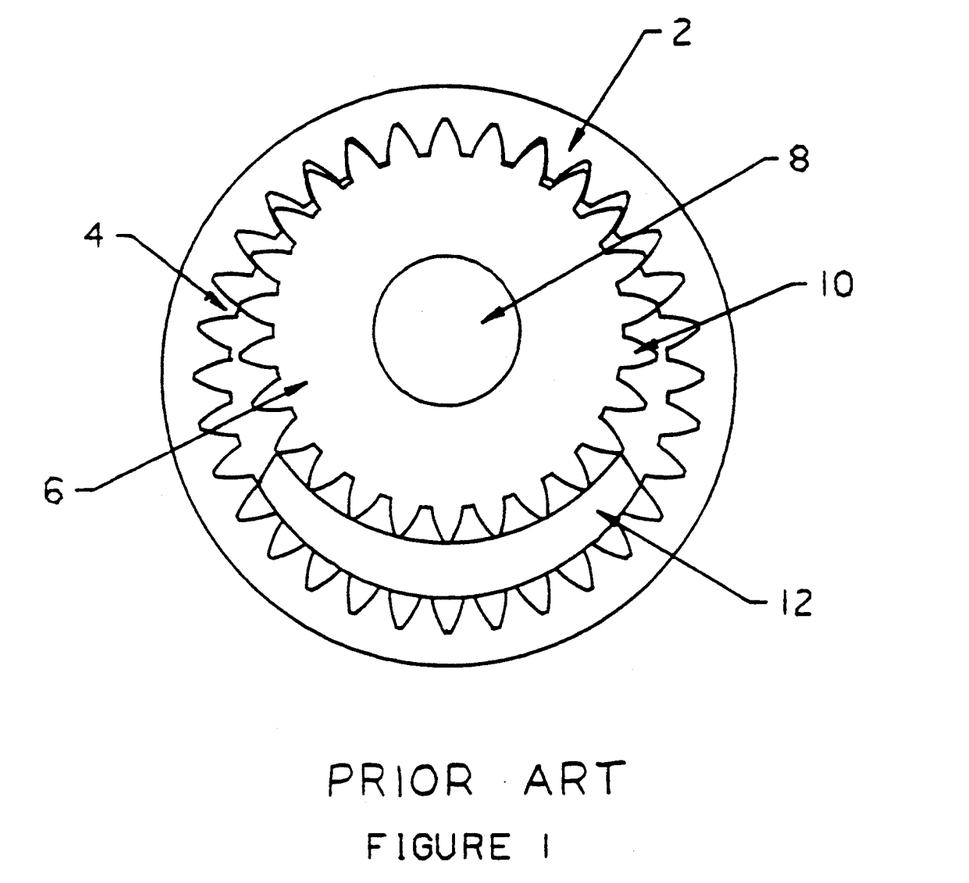
FIG. 1 illustrates a prior art crescent involute gear pump arrangement.

FIG. 1 illustrates the top plan view of a prior art involute crescent gear set. In particularly FIG. 1 illustrates the outer gear or rotor 2 having internal teeth 4.

An inner gear or rotor 6 is concentrically journaled for rotation about a shaft 8. The inner gear 6 includes exterior teeth 10. The teeth 4 and 10 have involute gear profiles. A crescent shaped piece of metal 12 is inserted between the gears 4 and 8 at the lower dead band location. The gears 4 and 6 are located within a housing chamber (not shown) which housing has an intake port (not shown) and a discharge port (not shown). The resulting pump seals across the drive surface on the involute at the top dead band 12 as well as between the ends of the internal and external gear teeth 4 and 6 and the crescent 12.

Involute crescents generally have a large number of teeth relative to other types of pumps. Furthermore involute crescent gear pumps require a large offset in order to function properly which greatly reduces the displacement of the pump for a given pump size.

Figure 2:
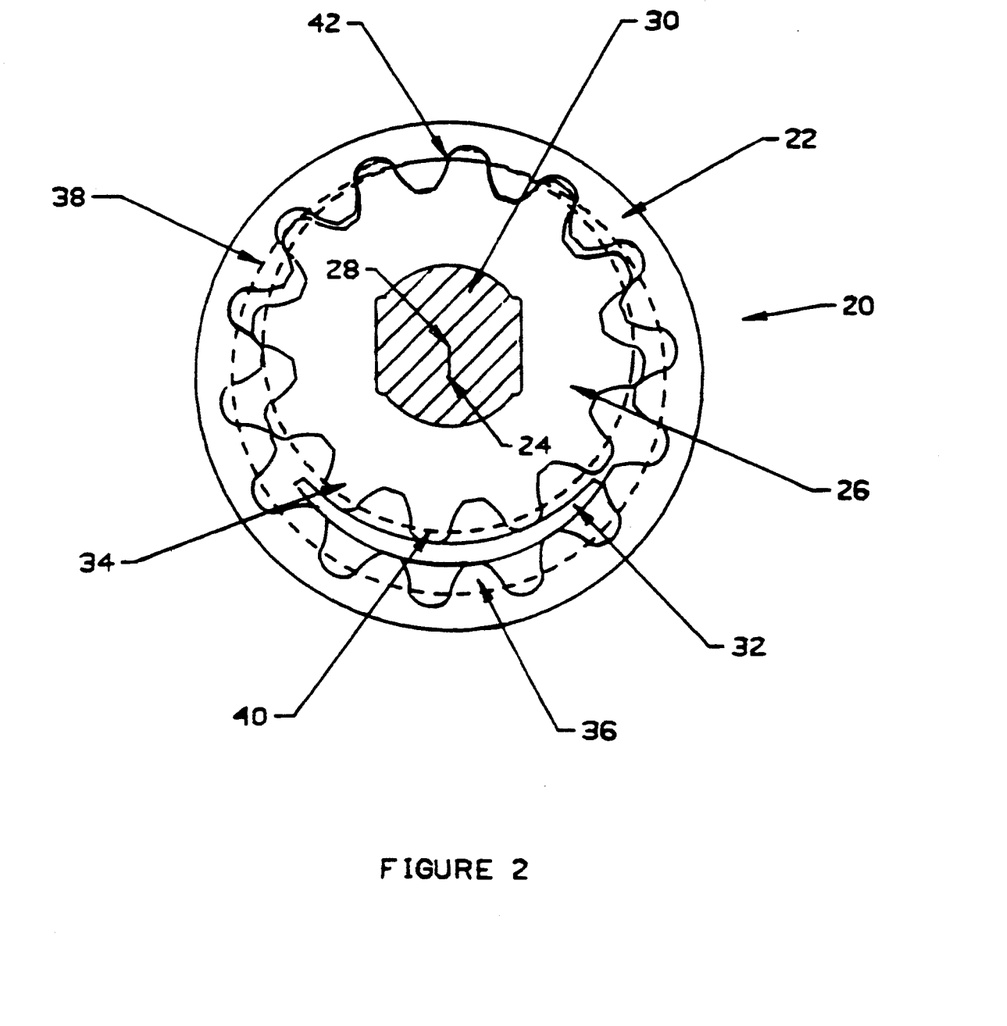
FIG. 2 is a top plan view of the dual cycloidal crescent gear set.
Figure 5:
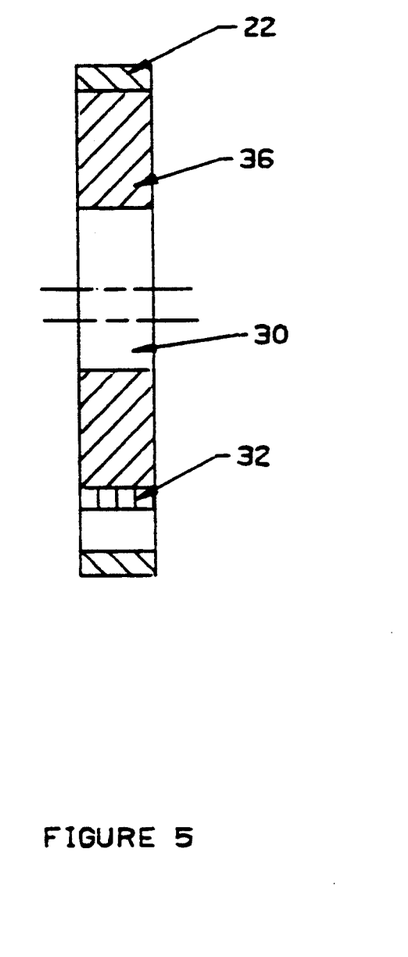
FIG. 5 is a cross-sectional view of said dual cycloidal crescent gear set.

FIG. 2 illustrates the crescent gear set 20 of the invention to be described herein which comprises of an internally toothed annular gear 22 journaled for rotation about a second axis 24 and an externally toothed annular gear 26 rotatably engageable with the internally toothed annular gear 22 about a first axis 28. The interior gear 26 is also journaled for rotation about a shaft 30 as best illustrated in FIGS. 2 and 5.

In the arrangement illustrated in FIG. 2, the inner and outer gears 26 and 22 are adapted to be placed within a housing (not shown) which housing includes a chamber to receive said crescent gear set 20. Furthermore, the housing includes an intake port (not shown) and a discharge port (not shown). As the shaft 30 rotates, it drives the inner gear 26 so as to rotate the outer gear 22.

The inner gear 26 includes teeth 34 presenting dual cycloidal profiles. Furthermore, the outer gear 22 includes teeth 36 having a dual cycloidal profile. The crescent 32 seals across the teeth 34 and 36 along the bottom dead band.

As the outer gear 22 rotates, the fluid, such as oil or the like, is drawn from the intake port (not shown) and fills the space between the teeth 34 and 36 until such teeth contact the crescent 32. Upon further rotation of the inner and outer gears 26 and 22, the fluid between the teeth after the crescent 32 becomes compressed and then discharged out of the discharge port (not shown).

The outer or second gear 22 includes a pitch circle or outer generating circle 38 and the inner gear 26 includes an inner pitch circle or first generating circle 40. The outer pitch circle 38 is concentric about axis second 24 and the inner pitch circle first 38 is centred about axis 28.

The inner and outer pitch circles 40 and 38 are tangent at the top dead band 42 as shown in FIG. 2.

Figure 3:
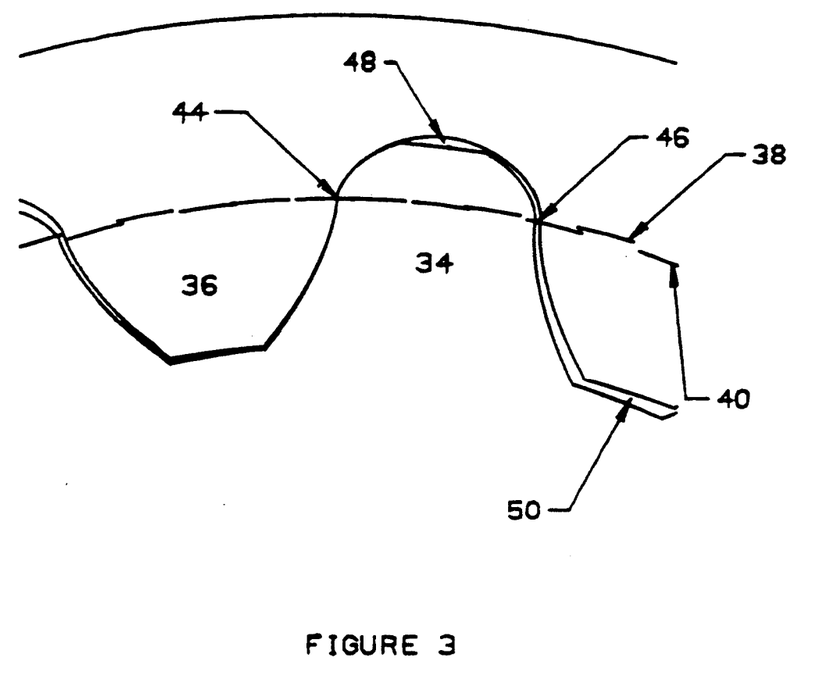
FIG. 3 is a partial top plan view of the tooth engagement of the invention.

FIG. 3 shows the exterior tooth 34 of inner gear 26 meshing with interior tooth 36 of outer gear 22 at point 44. The backlash 46 is illustrated in FIG. 3 and comprises of the space between the teeth 34 and 36. Furthermore, the inner crescent radius with clearance is illustrated at 48 and the outer crescent radius with clearance is illustrated at 50 as best shown in FIG. 3.

Figure 4:
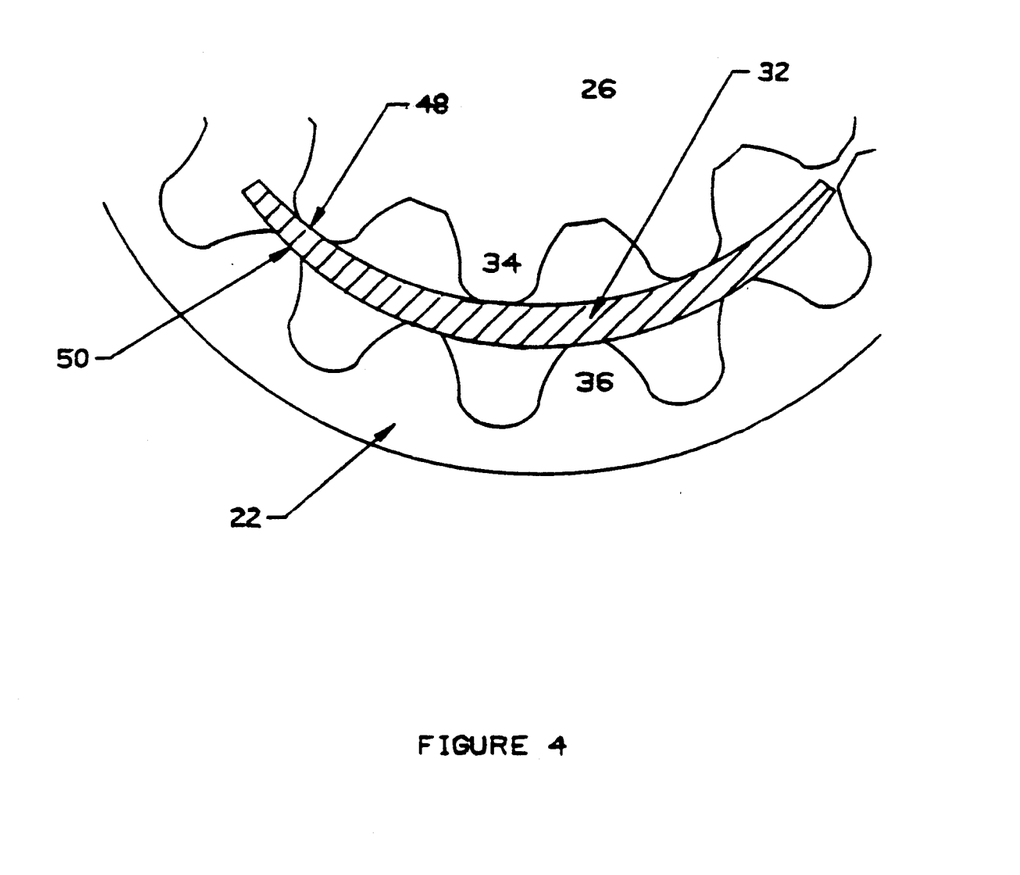
FIG. 4 is a partial top plan view of the crescent area of the gear pump.

The inner crescent radius with clearance 48 and outer crescent radius with clearance 50 is also shown in FIG. 4.

Figure 7:
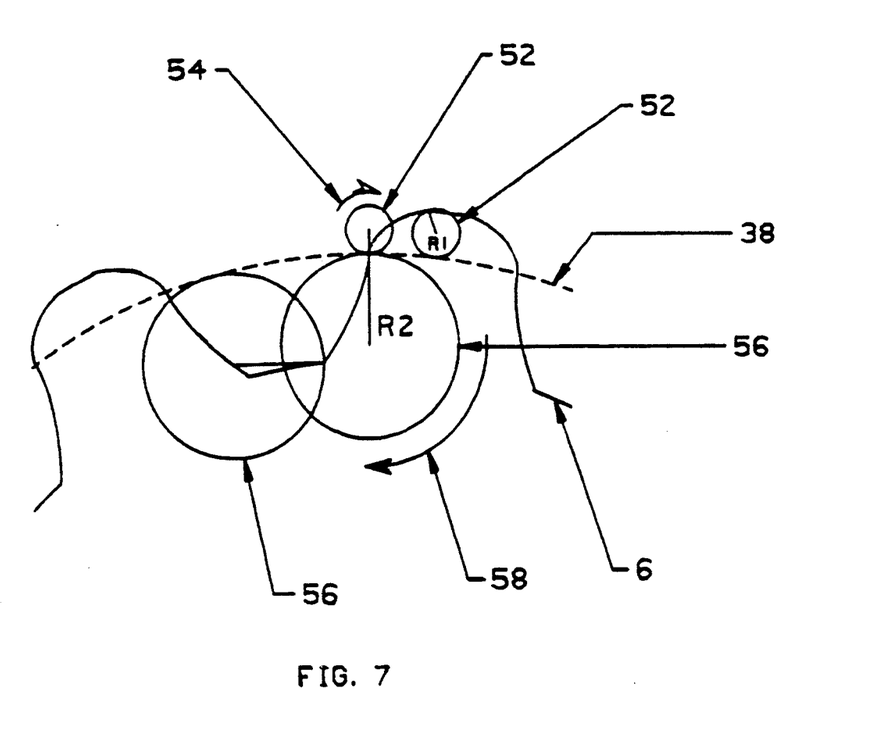
FIG. 7 illustrates the generating of an outer cycloid profile.

The generation of the dual cycloidal outer gear 22 shall now be described in relation to FIG. 7. The dual cycloidal outer gear 22 is generated using a pair of a epi and hypo cycloid sets rolling around a single generating circle (i.e., second generating circle) or pitch circle of the outer gear 38. The sum of the radii $R_1$ and $R_2$ equal the offset of the inner and outer gear 26 and 22. In particularly the offset is defined by the distance between the second axis 24 and the first axis 28 as shown in FIG. 2. The radius of the pitch circle 38 of outer gear 22 equals half the number of teeth 36 on the outer gear 22 multiplied by the offset. The radius $R_1$ of the epi cycloid will be between 20% to 25% of the offset and the radius $R_2$ of the hypo cycloid will be between 75% to 80% of the offset.

The tooth 36 of the outer gear 22 is generated as follows:

(a) The epi cycloid 52 of a first cycloid is rolled in a clockwise direction 54 about the generating circle 38 starting at the vertical axis for a full 180° of roll.

(b) The hypo cycloid 56 of the first cycloidal set is rolled in a counterclockwise direction 58 around the generating or pitch circle 38 starting at the vertical axis until the generated curve intersects the radius of the outer crescent 50.

(c) The epi cycloid of a second cycloidal set is rolled in a counter-clockwise direction about the generating circle 38 starting at an angle from the vertical axis equal to 360° divided by the number of teeth of the outer gear 22 minus two times the angle resulting from the length of roll of the first epi cycloid 52 roll for a complete 180° of roll.

(d) The hypo cycloid of the second cycloidal set is rolled in a clockwise direction around the generating circle 38 starting at an angle from the vertical axis equal to 360° divided by the number of teeth on the inner gear minus two times the angle resulting from the roll of the first epi cycloid roll, until the generated curve intersects the radius of the outer crescent arch 50.

(e) The resulting gear profiles are connected with an arch slightly offset from the outer crescent arch 50 in order to provide running clearance.

(f) The resulting tooth form 36 can be mirrored and rotated about the centre of the generating circle 38 to create a complete outer gear.

Figure 6:
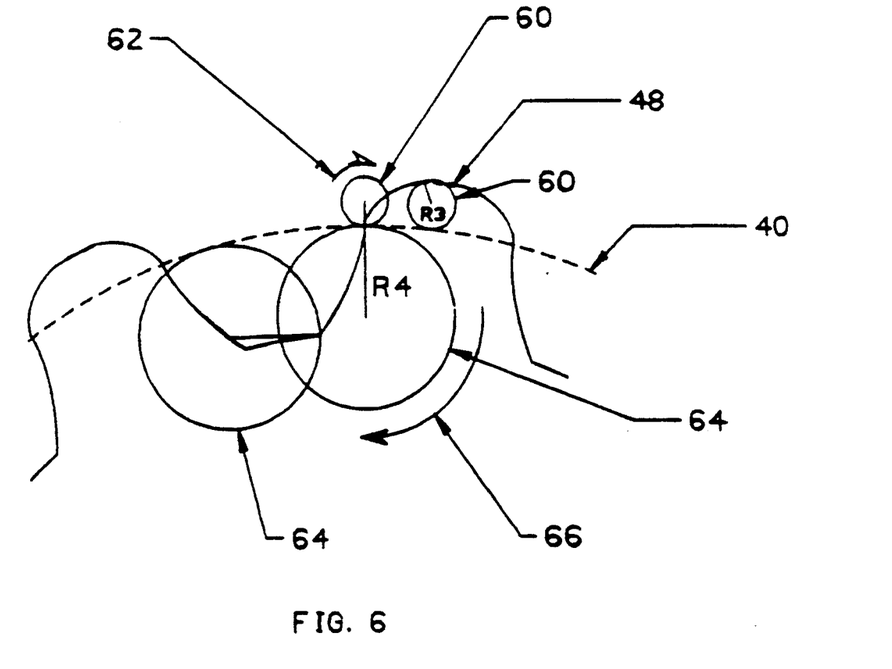
FIG. 6 illustrates the generating of an inner cycloid profile.

The generation of the dual cycloidal inner gear shall now be described in relation to FIG. 6. The dual cycloidal inner gear 26 is generated using a pair of epi and hypo cycloid sets rolling around a single generating circle 40. The sum of the radii of the cycloid set $R_3$ and $R_4$ equals the offset of the inner and outer gear 26 and 22. The radius of the generating circle 40 equals half the number of teeth 34 on the inner gear 26 multiplied by this offset. The radius of the epi cycloid $R_3$ will be between 20% to 25% of the offset, and the radius of the hypo cycloid will be between 75% to 80% of the offset.

A tooth 34 of the inner gear 26 is generated as follows:

(a) The epi cycloid 60 of the first cycloid set is rolled in a clockwise direction 62 until the generated curve intersects the inner crescent radius 48.

(b) The hypo cycloid 64 of the first cycloidal set is rolled in a counter-clockwise direction 66 around the generating circle 40 starting at the vertical axis until the generated curve is slightly smaller in length than the hypo cycloid curve generated on the outer gear 22.

(c) The epi cycloid of the second cycloidal set is rolled in a counter-clockwise direction about the pitch circle 40 starting at an angle from the vertical axis equal to 360° divided by the number of teeth on the inner gear minus two times the angle resulting from a full 180° theoretical roll of the first epi cycloid 60 until the generated curve intersects the inner crescent radius 48.

(d) The hypo cycloid of the second cycloidal set is rolled in a clockwise direction around the generating circle 40 starting at an angle from the vertical axis equal to 360° divided by the number of teeth on the inner gear 26 minus two times the angle resulting from the full 180° theoretical roll of the first epi cycloid 60 until the generated curve is slightly smaller in length than the hypo cycloid curve generated on the outer gear 22 and is equal in length to the hypo cycloid curve generated by the first cycloid set.

(e) The resulting gear profiles are connected with an arch offset slightly from the connecting arch on the outer gear set to provide a running clearance.

(f) The resulting gear form is rotated an copied about the centre of the generating circle at angle increments equal to 360° divided by the number of teeth on the inner gear 26.

(g) The gaps left between the truncated epi cycloids are connected with an arch slightly smaller than the inner crescent arch in order to provide running clearance.

The resulting gear set 22 and 26 will have two more teeth on the outer gear 22 than the inner gear 26 and will operate as a crescent gear pump.

Figure 9:
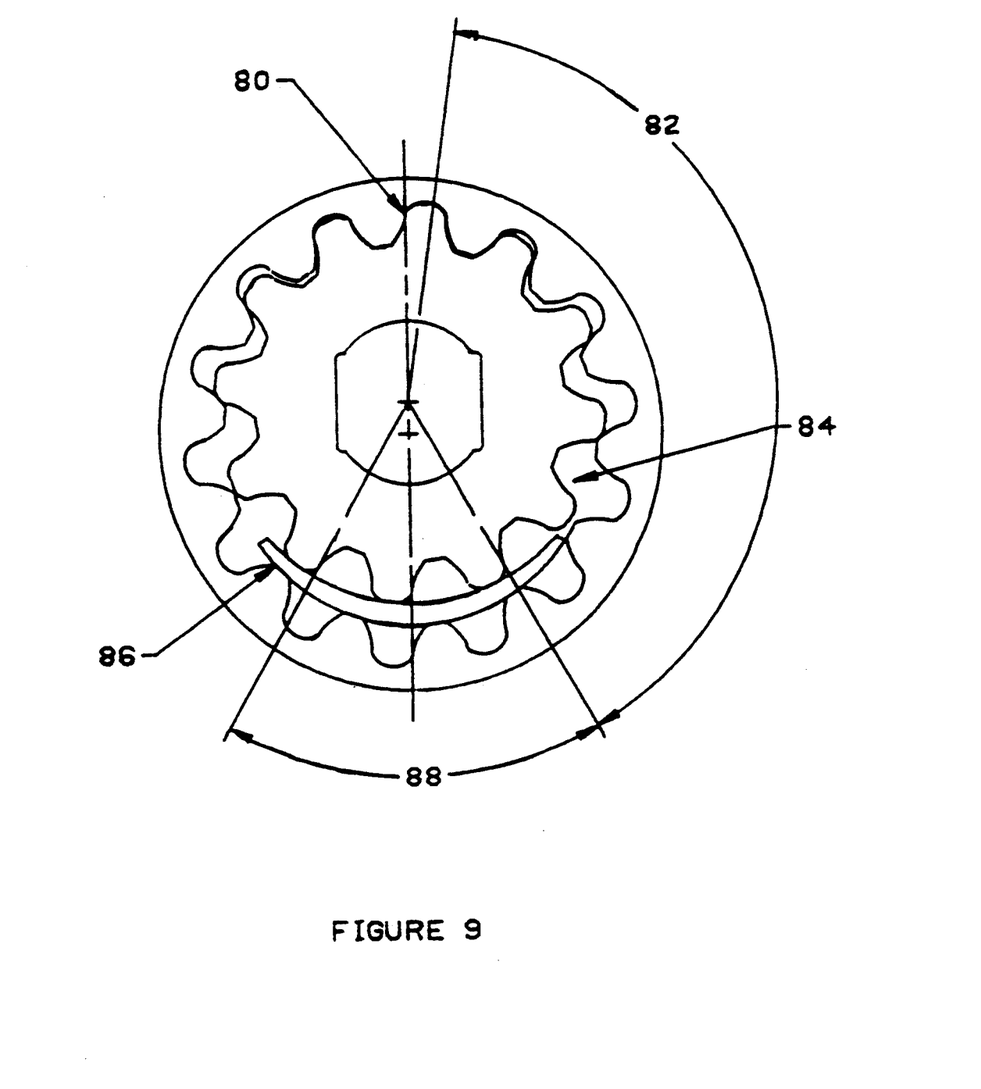
FIG. 9 is another top plan view of the dual cycloidal crescent gear set.

FIG. 9 illustrates the top dead band seal point 80 at the rotor drive. Furthermore, FIG. 9 also illustrates the intake and exhaust dwell 82 which in the configuration shown in FIG. 9 dwell of 141.78°. Furthermore, an intake separation 84 is shown as well as the bottom seal across the tooth and crescent 86. The bottom dead band 88 as shown in FIG. 9 comprises of 60°.

Figure 8:
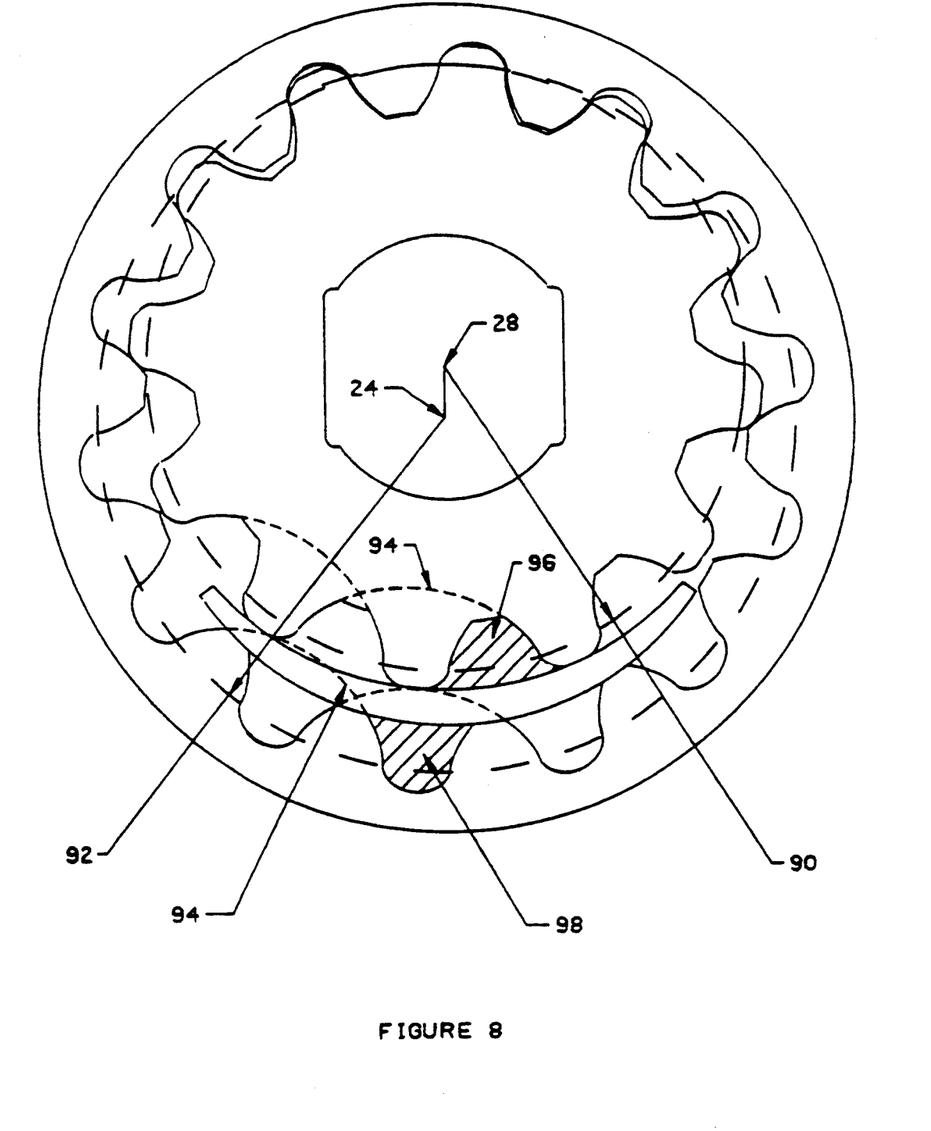
FIG. 8 illustrates a top plan view of the gear set or rotary assembly.

FIG. 8 illustrates the pitch radius 90 of inner rotor 26 and the pitch radius 92 of the outer rotor 22. Furthermore, line 94 shows the continuation of the lower tooth profile generated in the manner as described above.

Furthermore, the pocket area 96 of the inner rotor 26 as well as the pocket area 98 of the outer rotor 22 is shown in FIG. 8.

The displacement generated per revolution of the dual cycloidal gear set is equal to the number of inner gear teeth 34 times the sum of the pocket area 96 of the inner gear 26 and the pocket area 98 of the outer gear 22 to the crescent 32.

The teeth of the inner and outer gears 26 and 22 area shaped to conform to the shape of the crescent 32 where they are in contact with the crescent 32 to obtain a more restrictive leakage path. The actual clearance between the inner and out teeth tip to the crescent 32 and the number of teeth in contact with the crescent will determine the amount of leakage of the pump.

The pump which utilizes the dual cycloidal gear sets as described herein allows the pump to displace more oil from an equivalent size gear set or the same amount of oil from a smaller more efficient gear set.

Furthermore, optimized sealing capabilities are observed with the invention as described herein as the bottom dead band through the large crescent 32 to gear sealing area resulting form the square tooth shape which is generated by utilizing the invention as described herein.

Although the preferred embodiment as well as the operation and use have been specifically described in relation to the drawings, it should be understood that variations in the preferred embodiment could easily be achieved by a man skilled in the art without departing from the spirit of the invention. Accordingly the invention should not be understood to be limited to the exact form revealed by the drawings.

The embodiments of the invention in which an exclusive property or privilege is claimed are defined as follows:

1. In a crescent gear set comprising:
   (a) externally toothed annular gear means journaled for rotation about a first axis;
   (b) internally toothed annular gear means rotatably engageable with said externally toothed annular gear means about a second axis;
   (c) crescent means contacting a portion of said internally and externally toothed annual gear means;
   (d) said externally toothed gear means having dual cycloidal toothed profiles generated about a first generating circle, and said internally toothed gear means having dual cycloidal toothed profiles generated about a second generating circle.

2. In a crescent gear set as claimed in claim 1 wherein said first and second axis are offset.

3. In a crescent gear set as claimed in claim 2 wherein said internally toothed annular gear means defines an outer gear.

4. In a crescent gear set as claimed in claim 3 wherein said externally toothed annular gear means defines an inner gear.

5. In a crescent gear set as claimed in claim 4 wherein said outer gear has a greater number of teeth than said inner gear.

6. In a crescent gear set as claimed in claim 5 wherein said inner gear has teeth profiles defined by a first pair of epi and hypo cycloidal sets generated about said generating circle.

7. In a crescent gear set as claimed in claim 6 wherein the sum of the radius of said first pair of epi and hypo cycloids equals said offset.

8. In a crescent gear set as claimed in claim 7 wherein the radius of said first generating circle equals half the number of teeth of said inner gear multiplied by said offset.

9. In a crescent gear set as claimed in claim 8 wherein said outer gear has teeth profiles defined by a second pair of epi and hypo cycloidal sets generated about said second generating circle.

10. In a crescent gear set as claimed in claim 9 wherein the sum of the radius of said second pair of epi and hypo cycloids equals said offset.

11. In a crescent gear set as claimed in claim 10 wherein the radius of said second generating circle equals half the number of teeth of said outer gear multiplied by said offset.

12. In a crescent pump gear including:
   (a) housing means having a chamber communicating with an intake port and a discharge port;
   (b) shaft means journaled for rotation within said chamber;
   (c) externally toothed inner gear means mounted centrally on said shaft means about a first axis;
   (d) internally toothed annular gear means eccentrically mounted for rotatable engagement with said inner gear means about a second axis;
   (e) crescent means contacting a portion of said inner and outer gear means;
   (f) said inner gear means having dual cycloidal tooth profiles generated about a first generating circle, and said outer gear means having dual cycloidal toothed profiles generated about a second generating circle.

13. In a crescent pump gear as claimed in claim 12 wherein said first and second axis are offset.

14. In a crescent pump gear as claimed in claim 13 wherein said outer gear means has a greater number of teeth than said inner gear means.

15. In a crescent pump gear as claimed in claim 14 wherein said inner gear means has tooth profiles defined by a first pair of epi and hypo cycloids generated about a single inner pitch diameter of said inner gear.

16. In a crescent pump gear as claimed in claim 15 wherein the sum of the radius of said epi and hypo cycloids equals said offset.

17. In a crescent pump gear as claimed in claim 16 wherein the radius of said inner pitch circle equals half the number of teeth of said inner gear means multiplied by said offset.

18. In a crescent pump gear as claimed in claim 17 wherein said outer gear means presents teeth profiles defined by a second pair of epi and hypo cycloids generated about a single outer pitch diameter of said outer gear.

19. In a crescent pump gear as claimed in claim 18 wherein the sum of the radius of said epi and hypo cycloids equals said offset.

20. In a crescent pump gear as claimed in claim 19 wherein the radius of said outer pitch circle equals half the number of teeth of said outer gear multiplied by said offset.

21. In a crescent pump gear as claimed in claim 20 wherein said radius of said epi cycloid of said inner gear means is between 20 to 25 percent of said offset.

22. In a crescent pump gear as claimed in claim 21 wherein said radius of said hypo cycloid of said inner gear means is between 75 to 80 percent of said offset.

23. In a crescent pump gear as claimed in claim 22 wherein said radius of said epi cycloid of said outer gear is between 20 to 25 percent of said offset.

24. In a crescent pump gear as claimed in claim 23 wherein said radius of said hypo cycloid of said outer gear means is between 75 to 80 percent of said offset.

25. In a method of producing tooth profiles of externally toothed inner gears eccentrically offset and engageable with internally toothed annular outer gears, said inner and outer gears contacting a crescent having an inner crescent radius and an outer crescent radius, said method including the steps of:
   (a) generating the pitch circle of said outer gear;
   (b) producing an epi cycloid of a first cycloid set by rolling said epi cycloid in a clockwise direction about the pitch circle of said outer gear starting at the vertical axis for a full 180° of roll;
   (c) producing a hypo cycloid of a first cycloid set by rolling in a counterclockwise direction around said pitch circle of said outer gear starting at the vertical axis until the generated curve intersects at said outer crescent radius;
   (d) producing an epi cycloid of a second cycloid set by rolling in a counterclockwise direction about said pitch circle of said outer gear starting at an angle from the vertical axis equal to 360° divided by the number of teeth of said outer gear minus two times the angle resulting from the length of roll of said first epi cycloid roll for a complete 180°;
   (e) producing a hypo cycloid of a second cycloid set by rolling in a clockwise direction about said pitch circle of said outergear starting at an angle from the vertical axis equal to 360° divided by the number of teeth on said outer gear minus two times the angle resulting from the roll of said first epi cycloid roll until the generated curve intersects said outer crescent radius;

(f) connecting the resulting gear profiles with an arc slightly offset from said outer crescent radius in order to provide running clearance;

(g) copying the resulting gear form about the centre of said pitch circle of said outer gear at increments equal to 360° divided by the number of teeth of said outer gear;

(h) generating the pitch circle of said inner gear;

(i) producing an epi cycloid of a first cycloid set by rolling said epi cycloid in a clockwise direction about said pitch circle of said inner gear by starting at the vertical axis of said pitch circle of said inner gear until the generated curve intersects said inner crescent radius;

(j) producing a hypo cycloid of a first cycloid set by rolling in a counterclockwise direction about said pitch circle of said inner gear by starting at the vertical axis until the generated curve is slightly smaller in length than said hypo cycloid curve generated on said outer gear;

(k) producing an epi cycloid of a second cycloid set by rolling in a clockwise direction about said pitch circle of said inner gear starting at an angle from the vertical axis equal to 360° divided by the number of teeth on said inner gear minus two times the angle resulting from a full 180° theoretical roll of said first epi cycloid until the generated curve intersects at inner crescent radius;

(l) providing a hypo cycloid of a second cycloid set by rolling in a clockwise direction around the pitch circle of said inner gear starting at an angle from the vertical axis equal to 360° divided by the number of teeth on the inner gear minus two times the angle resulting from the full 180° theoretical roll of said first epi cycloid until the generated curve is slightly smaller in length than the hypo cycloid curve generated on the outer gear and is equal in length to the hypo cycloid curve generated by said first cycloid set;

(m) connecting the resulting gear profiles with an arc offset slightly from the connecting arc on the outer gear set to provide a running clearance;

(n) copying the resulting gear form about the centre of said pitch circle of said inner gear at increments equal to 360° divided by the number of teeth of said inner gear;

(o) connecting the gaps left between said epi cycloids with an arc slightly smaller than the inner crescent arc in order to provide running clearance.

26. In a method as claimed in claim 25 wherein the sum of the radius of said cycloid sets of said outer gear equal the offset.

27. In a method as claimed in claim 26 wherein said pitch circle of said outer gear equals half the number of teeth on the outer gear multiplied by said offset.

28. In a method as claimed in claim 27 wherein the radius of said epi cycloids of said outer gear is between 20 and 25 percent of said offset.

29. In a method as claimed in claim 28 wherein the radius of said hypo cycloids is between 75 and 80 percent of said offset.

30. In a method as claimed in claim 29 wherein the sum of the radius of said cycloid sets of said inner gear equals the offset of said inner and outer gear.

31. In a method as claimed in claim 30 wherein the radius of said pitch circle equals half the number of teeth of said inner gear multiplied by said offset.

32. In a method as claimed in claim 31 wherein said radius of said epi cycloids of said inner gear is between 20 and 20 percent of said offset.

33. In a method as claimed in claim 32 wherein the radius of said hypo cycloids is between 75 to 80 percent of said offset.

* * * * *